United States Patent [19]

Stillman

[11] 4,284,672

[45] Aug. 18, 1981

[54] FLEXIBLE PACKAGING COMPOSITE COMPRISING AN OUTER POLYAMIDE LAYER, AN INTERMEDIATE METAL FOIL LAYER AND AN INTERIOR HEAT-SEALABLE LAYER

[75] Inventor: Nathan Stillman, Walnut Creek, Calif.

[73] Assignee: Champion International Corporation, Stamford, Conn.

[21] Appl. No.: 104,799

[22] Filed: Dec. 18, 1979

[51] Int. Cl.³ .................. B32B 1/02; B32B 15/08; B65D 37/00
[52] U.S. Cl. .................... 428/35; 206/524.2; 229/3.5 MF; 426/126; 428/349; 428/354; 428/457; 428/458; 428/461; 428/475.5; 428/475.8; 428/476.1; 428/476.3; 428/476.9
[58] Field of Search .............. 426/126; 229/3.5 MF; 206/524.2; 428/910, 349, 354, 457, 458, 461, 475.5, 475.8, 476.1, 476.3, 476.9, 35

[56] References Cited

U.S. PATENT DOCUMENTS

| | | | |
|---|---|---|---|
| 4,085,244 | 4/1978 | Stillman | 428/910 |
| 4,182,457 | 1/1980 | Yamada et al. | 220/453 |
| 4,190,477 | 2/1980 | Ossion et al. | 428/35 |
| 4,216,268 | 8/1980 | Stillman | 428/458 |
| 4,241,130 | 12/1980 | Barnes | 428/475.8 |

FOREIGN PATENT DOCUMENTS 1378140 12/1974 United Kingdom .............. 426/126

*Primary Examiner*—James C. Cannon
*Attorney, Agent, or Firm*—Evelyn M. Sommer

[57] ABSTRACT

A laminated packaging film useful in producing such items as pouches and containers for liquids, comprises an outer layer of balanced biaxially oriented thermoplastic polymer, a middle layer of flexible metal foil, an inner layer of heat-sealable, rubber modified high density polyethylene, or ethylene copolymer and an adhesive layer between the middle and inner layers. The pouches and containers formed by this film are exceptionally strong, durable and flexible.

8 Claims, 2 Drawing Figures

FLEXIBLE PACKAGING COMPOSITE COMPRISING AN OUTER POLYAMIDE LAYER, AN INTERMEDIATE METAL FOIL LAYER AND AN INTERIOR HEAT-SEALABLE LAYER

CROSS-REFERENCE TO RELATED APPLICATION

Reference is made to my copending application Ser. No. 104,562, filed Dec. 17, 1979, entitled "Flexible Laminated Packaging Material."

BACKGROUND OF THE INVENTION

The present invention relates to a composite, flexible film of highly improved properties. More particularly, the present invention relates to a packaging film for forming self-sealed containers which may be easily transported in essentially flat, compressed form and which are capable of retaining 5 to 20 or more liters of liquid or semi-liquid content without succumbing to the physical stresses caused by movement or shift of the liquid within the containers.

Conventional containers for transporting and storing large volumes of liquid or semi-liquid content, e.g., ketchup, syrup, wine or the like, involve the use of containers of fixed dimensions, such as cans and cartons. These rigid containers have numerous drawbacks. Due to their rigid construction, the rigid containers must be unusually strong to withstand the physical stresses exerted by the liquid or other matter within the container. This is particularly true with larger volumes of liquid or semi-liquid materials which may shift during transport. Moreover, the use of a rigid container of heavy construction makes it uneconomical to transport such containers unless they are filled. Even when empty, the rigid containers occupy their full volume. Therefore, for commercial use, the rigid containers must be produced close to the site of filling and may not be reused, due to the high transport cost.

The flexible packaging film, and container produced therefrom, of the present invention permits the production of a lightweight, flexible container which may be employed to package substantial volumes and/or weights of liquid, semi-liquid and solid materials. The flexibility and strength of the film of the present invention, even for large containers, permits the container formed therefrom to contain volumes of, for example, from 5 to 20 liters, and weights of, for example, 20 to 30 kilograms. Moreover, since the film and the containers formed therefrom are flexible, such containers may be compressed into essentially flat form when they are empty to permit them to be easily and economically shipped, stored, transported and reused in both the filled and empty conditions.

Additionally, the flexibility of the films permits the container formed therefrom to withstand greater physical stresses caused by shifts in the container's contents than equivalently sized rigid containers. The physical stresses caused by the contents shifting may be absorbed by movement and stretching of the container wall. This enables the containers of the present invention to be composed of material of significantly lower strengths and weight than those employed in rigid containers of equivalent size. Such flexible film containers are disclosed in U.S. Pat. Nos. 4,085,244 and 4,096,309 to Stillman. The film disclosed in U.S. Pat. No. 4,085,244 comprises, in order from outside in, an outer layer of balanced biaxially oriented polyamide, a flexible metal foil, a layer of balanced biaxially-oriented polypropylene and an inner layer of heat-sealable, medium density polyethylene or polypropylene. However, difficulties have been experienced in the use of such films.

SUMMARY OF THE INVENTION

It is an object of the present invention to provide a composite, flexible packaging film which is self-sealing and of high strength.

Another object of the present invention is to provide a composite, flexible packaging film in which the various layers of the composite packaging film are arranged in a sequence which provides maximum interlayer cooperation, and simplifies and facilitates manufacture of the film.

A further object of the present invention is to provide a composite, flexible packaging film of exceptionally high flex-resistance which is useful for forming containers for large volumes of liquid, semi-liquid and solid materials.

A still further object of the present invention is to form a flexible self-sealing container of flexible, laminated material which is collapsible and which may be commercially and efficiently stored and transported whether filled or empty, and which is capable of retaining contents of high weight and volume.

The foregoing objects are attained by providing a composite, flexible packaging film comprising an outer layer of balanced biaxially oriented thermoplastic polymer, a middle layer of flexible metal foil affixed to one surface of the outer layer, an inner layer of a heat-sealable ethylene copolymer affixed to the surface of the middle layer opposite the outer layer, and a first adhesive layer between the middle and inner layers.

The film of the present invention is a significant improvement over that disclosed in U.S. Pat. No. 4,085,244 to Stillman. By forming the inner heat-sealable layer of an ethylene copolymer, the intermediate layer of a balanced biaxially-oriented polypropylene between the foil and heat-sealable layers may be eliminated.

Other objects, advantages, and salient features of the present invention will become apparent from the following detailed description, which, when taken in conjunction with the annexed drawings discloses preferred embodiments of the present invention.

BRIEF DESCRIPTION OF THE DRAWINGS

Referring to the drawings which form a part of this disclosure.

DETAILED DESCRIPTION OF PREFERRED EMBODIMENTS OF THE INVENTION

Figure 1:
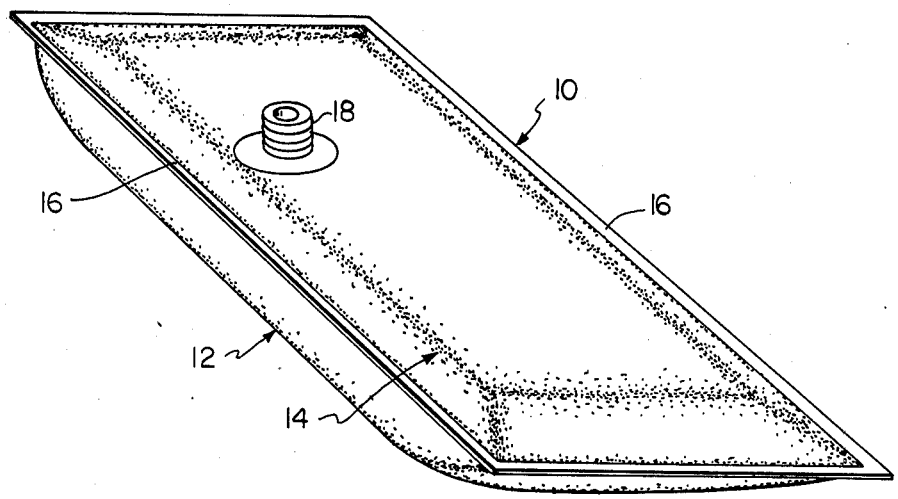
FIG. 1 is a perspective view illustrating a container formed in accordance with the present invention.

Referring to FIG. 1, a container in the form of a pouch 10 is illustrated. The pouch 10 is formed from two separate sheets 12, 14 of the composite, flexible packaging film. The perimeter portion 16 of the sheets 12, 14 are heat-sealed together to contain the contents of the pouch 10 therein. A screw spigot 18 may be provided in the sheet 14 to facilitate filling and emptying the pouch 10 of its contents.

In an alternative embodiment, not shown, a pouch similar to that illustrated in FIG. 1 may be formed of a single sheet of film. Thus, a single sheet of film may be folded 180° at its midpoint and then heat-sealed at its outer periphery along the remaining edges to form a unitary pouch. With such arrangement, only three, instead of four, edges need be heat-sealed.

Figure 2:
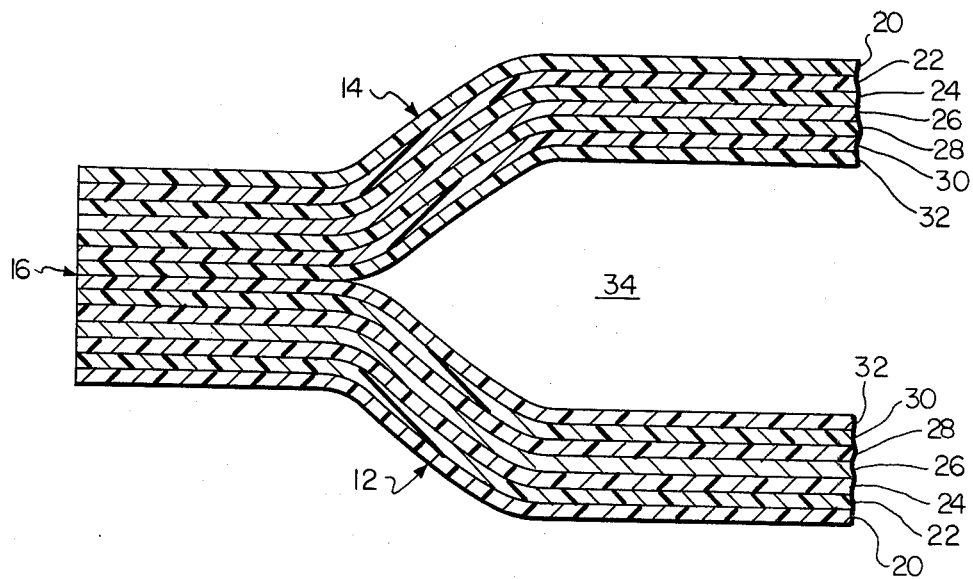
FIG. 2 is a partial elevational view in cross section graphically illustrating the composite, flexible packaging films used to form the container of FIG. 1.

FIG. 2 graphically illustrates (i.e., not drawn to scale) in cross section the laminated arrangement of the sheets 12, 14. Each of the sheets 12, 14 has seven layers. These layers are, in order, from the outside to the inside of each sheet, an outer layer of balanced biaxially oriented thermoplastic polymer 20, a primer coating 22, an adhesive layer 24, a metallic foil layer 26, a primer wash layer 28, an adhesive layer 30, and an inner layer of heat-sealable, ethylene copolymer 32. When the two sheets 12, 14 are sealed, as shown in FIG. 2, along the perimeter portion 16, an internal cavity 34 is defined therebetween in which the contents of the container are to be entrapped.

Of the seven layers described above, only four are essential. The essential layers are the outer layer of balanced biaxially oriented thermoplastic polymer 20, the middle layer of flexible metal foil 26, the adhesive layer 30 between the middle layer 26 and the inner layer 32, and the inner layer of heat-sealable, ethylene copolymer 32. When these layers are fixed together, preferably through the use of various sealers and adhesive, these layers produce a composite, laminate film of unusually high strength and flex resistance.

The outer layer 20 is composed of a thermoplastic polymer which is biaxially oriented. Since the outer layer 20 is biaxially oriented in essentially balanced degree, the outer layer 20 provides substantial flex-crack resistance. Additionally, the balanced biaxial orientation results in the film being strongly resistant to bursting and tearing.

The thermoplastic polymer of the layer 20 may be any of the polyamides known in the art, although nylons are particularly preferred. It is necessary only that they have been stretched to provide a balanced biaxial orientation. The outer layer 20 may be have a thickness of 0.00048 to 0.002 inch, but preferably is about 0.0006 inch thick. This thickness provides a strong and flexible outer covering to the film and pouch of the present invention.

The middle layer 26 may be composed of any of the flexible metal foils known in the art, e.g., lead, copper or preferably aluminum. The thickness of the foil layer 26 is ordinarily from 0.00025 to 0.001 inch, but is preferably about 0.00035 inch. In addition to providing excellent protection from ultraviolet light, the metal foil layer 26 has a high resistance to vapor penetration and provides an excellent barrier to penetration of liquid, particularly water or moisture, through the film.

The adhesive layer 30 is preferably an ethylene acrylic acid copolymer. The ethylene acrylic acid copolymer significantly improves the adhesion of the metal foil layer 26 to the inner layer 32 of polyolefin over that heretofore known in this art. Additionally, this adhesive layer 30 provides a barrier layer which prevents the contents of the package from attacking the metal foil layer 26. It also reduces the air permeability of the film. The weight of the extrusion lamination of the ethylene acrylic acid copolymer may be from 5 to 30 pounds per ream (i.e., 24×36/500), but is preferably 7 to 8 pounds per ream.

The adhesive layer 30 may also comprise polyethylene in the same quantities as that specified above for the ethylene acrylic acid copolymer or an adhesive with weights from 1 to 3 pounds per ream.

The inner layer 32 of a heat-sealable, an ethylene copolymer enables the sheets 12, 14 to be sealed at their perimeter portions 16 by heat-sealing in order to form the pouch 10 and significantly enhances the overall strength of the film. The layer 32 may be comprised of an ethylene copolymer (e.g., that distributed by DuPont of Canada under the trademark SCLAIR), or a rubber modified high density polyethylene. An ethylene copolymer may be employed for packing wine or aseptic packaging. Rubber modified high density polyethylene may be employed for contents which are hot or where relatively high chemical resistance is necessary. The inner layer 32 may have a thickness from 0.001 to 0.005 inch, but is preferably about 0.002 inch. The inner layer 32 also contributes to the impermeability of the film of the present invention. The rubber modified high density polyethylene or ethylene copolymer obviates the necessity of providing an additional plastic sheet between the metal foil layer and the inner sealant layer.

The unique physical characteristics of the film of the present invention and of the pouch formed therefrom are believed to be at least partially attributable to the provision of an adhesive layer of ethylene acrylic acid copolymer between the metal foil layer 26 and the polyolefin layer 32. Metal foils are particularly susceptible to delamination from the polyolefin layer and from attack by the contents of the pouch 10 which may pass through the polyolefin layer 32. The provision of the ethylene acrylic acid copolymer adhesive between such layers significantly improves the strength and storage capabilities of the pouches formed from such a film.

In addition to the four essential layers 20, 26, 30, 32, there are certain optional layers or treatments which have been discovered to further enhance the strength and durability of the film of the present invention. These additional layers or treatments may be utilized, either individually or in combination, to further improve the characteristics of the packaging film of the present invention.

One optional layer is a primer coat 22 which may be applied to the internal surface of the biaxially oriented thermoplastic layer 20. This layer is of negligible thickness, but improves the adhesion of the thermoplastic polymer layer 20 to the metal foil 26. It may be composed of any of the primers known in the art, but particularly advantageous results are realized with the use of a polyethylene imine-type primer.

A layer 26 of adhesive resin also may be interposed between the balanced biaxially oriented thermoplastic layer 20 and the metal foil layer 26. The adhesive resin may be from 0.003 to 0.001 inch thick, but is preferably 0.0005 inch thick. Preferably, the adhesive resin 26 is an ethylene acrylic acid copolymer, and is most preferably utilized in conjunction with the above primer coat 22.

Between the metallic foil 26 and the adhesive layer 30, there is preferably provided an ethylene acrylic acid copolymer wash primer layer 28. This primer increases the chemical resistance of the metal foil 26 to further improve its barrier characteristics and enhances the adhesion between the metal foil layer 26 and the polyolefin layer 32.

Particularly advantageous composite packaging films are provided by the following examples:

| Example | Outer Balanced biaxially oriented thermoplastic layer 20 | Primer layer 22 | Second Adhesive Layer 24 | Middle metallic foil layer 26 | Wash primer layer 28 | First adhesive layer 30 | Inner Polyolefin layer 32 |
|---|---|---|---|---|---|---|---|
| I | nylon .0006" | polyethylene imine type | ethylene acrylic acid copolymer (8 lbs.) .0005" | foil .00035" | ethylene acrylic copolymer wash primer | ethylene acrylic acid copolymer (8 lbs.) .0005" | ethylene copolymer .002" |
| II | nylon .0006" | polyethylene imine type | ethylene acrylic acid copolymer (8 lbs.) .0005" | foil .00035" | ethylene acrylic copolymer wash primer | ethylene acrylic acid copolymer (8 lbs.) .0005" | rubberized modified high density polyethylene .002" |

It is also desirable to treat various ones of the layer surfaces further to improve the adhesion and integrity of the composite film of the present invention. For example, the balanced biaxially oriented polypropylene layer 20 may be treated on one surface to reduce its slip characteristics. This may be accomplished in a conventional fashion by application of an anti-slip agent. Further improvement of the film may be obtained by subjecting the polyamide and polyolefin layers to a corona discharge.

The layers of the composite films 12, 14, whether or not including one or more of the optional layers of this invention, may be readily laminated to form the present composite, packaging films. This lamination may be performed by any of the means well-known in the art. The preferred means of forming the composite film of the present invention will vary in a known manner, dependent upon available machinery and the selection of what, if any, optional layers are to be employed.

Where convenient, however, these laminates are most easily prepared in subcombinations, which subcombinations are then united.

If a primer coat is provided in the composite film, this coating should be applied directly to the polyamide or corona-treated polyamide surface prior to extrusion.

If the composite packaging film is also to include the preferred ethylene acrylic acid copolymer wash primer layer 28 over the inner surface of the metallic foil layer 26, the primer layer 28 may be applied to the inner metallic foil surface at any time prior to or following its affixation to the outer layer 20. However, it is preferred that the primer layer 28 be coated on the metallic foil 26 after fixation of the metallic foil to the outer layer 20.

Once the composite, flexible packaging film of the present invention has been formed into rolls or sheets, they may be easily manufactured into bags, pouches and like containers as described above in connection with FIG. 1.

The packaging films of the present invention possess exceptional physical characteristics which permit their substitution for the substantially stronger materials employed in prior art rigid containers. Also, they solve the major problem which has heretofor limited the utility of flexible films. The films of this invention successfully resist cracking of the foil layer 26 and rupture of laminate which have accompanied past attempts to package substantial volumes of liquid in a non-rigid container.

While various embodiments have been chosen to illustrate the invention, it will be understood by those skilled in this art that various changes and modifications can be made therein without departing from the scope of the invention as defined in the appended claims.

What is claimed is:

1. A composite, flexible packaging film consisting essentially of
   an outer layer of balanced biaxially oriented thermoplastic polymer;
   a middle layer of flexible metal foil affixed to one surface of said outer layer;
   an inner layer of a heat-sealable ethylene copolymer or rubber-modified high-density polyethylene affixed to a surface of said middle layer opposite said outer layer; and
   a first adhesive layer between said middle and inner layers.

2. A composite, flexible packaging film according to claim 1, wherein said first adhesive layer is ethylene acrylic acid copolymer.

3. A composite, flexible packaging film according to claim 2, wherein an ethylene acrylic acid copolymer wash primer is provided between said middle layer and said first adhesive layer.

4. A composite, flexible packaging film according to claim 1, wherein a second adhesive layer of ethylene acrylic acid copolymer is provided between said outer and middle layers.

5. A composite, flexible packaging film according to claim 4, wherein a polyethylene imine type primer is provided between said outer layer and said second adhesive layer.

6. A composite, flexible packaging film according to claim 1, wherein said outer layer comprises a polyamide.

7. A composite, flexible packaging film according to claim 6, wherein said outer layer comprises nylon.

8. A composite, flexible packaging film according to claim 1, which is formed into two sheets; said sheets oriented one on top of another with their inner layers facing each other; said sheets heat sealed at their edges to form a flexible pouch.

* * * * *